United States Patent
Wang

(10) Patent No.: US 9,016,304 B2
(45) Date of Patent: Apr. 28, 2015

(54) HORIZONTALLY-TRIGGERABLE INFLATION CONNECTOR

(71) Applicant: Beto Engineering and Marketing Co., Ltd., Taichung (TW)

(72) Inventor: Lopin Wang, Taichung (TW)

(73) Assignee: Beto Engineering and Marketing Co., Ltd., Taichung (TW)

(*) Notice: Subject to any disclaimer, the term of this patent is extended or adjusted under 35 U.S.C. 154(b) by 180 days.

(21) Appl. No.: 13/736,001

(22) Filed: Jan. 7, 2013

(65) Prior Publication Data

US 2014/0190576 A1  Jul. 10, 2014

(51) Int. Cl.
*F16K 15/20* (2006.01)
*B60C 23/10* (2006.01)
*B60C 29/06* (2006.01)
*B60S 5/04* (2006.01)

(52) U.S. Cl.
CPC .. *F16K 15/20* (2013.01); *B60S 5/04* (2013.01); *B60C 23/10* (2013.01); *B60C 29/06* (2013.01)

(58) Field of Classification Search
CPC .................................. F16K 15/20; B60S 5/04
USPC .......... 137/223, 231; 251/253, 263, 266, 284, 251/286, 288
See application file for complete search history.

(56) References Cited

U.S. PATENT DOCUMENTS

| | | | | |
|---|---|---|---|---|
| 4,343,456 A * | 8/1982 | Zitzloff | ................. | 251/255 |
| 6,220,273 B1 * | 4/2001 | Wu | ................. | 137/231 |
| 7,866,335 B2 * | 1/2011 | Wang | ................. | 137/231 |
| 8,408,235 B2 * | 4/2013 | Wu | ................. | 137/231 |
| 8,720,475 B2 * | 5/2014 | Wu | ................. | 137/231 |

* cited by examiner

*Primary Examiner* — Kevin Murphy
*Assistant Examiner* — R. K. Arundale
(74) *Attorney, Agent, or Firm* — Leong C. Lei

(57) ABSTRACT

A horizontally-triggerable inflation connector includes a casing, a packing unit, and a pull bar. The packing unit is received in the casing. The pull bar is arranged outside the casing and coupled to the packing unit. The pull bar is horizontally and reciprocally movable between a released position and a secured position. When the pull bar is at the released position, the packing unit is set in a released condition and when the pull bar is at the secured position, the packing unit is set in a compressed condition. Thus, the horizontally-triggerable inflation connector is operable to selectively secure or release an air valve so as to achieve convenience of operation.

11 Claims, 9 Drawing Sheets

HORIZONTALLY-TRIGGERABLE INFLATION CONNECTOR

TECHNICAL FIELD OF THE INVENTION

The present invention generally relates to an inflation connector, and more particularly to a horizontally-triggerable inflation connector.

DESCRIPTION OF THE PRIOR ART

An inflation device, such as manually-operating or electrically-operating air pumps, is provided with an inflation connector for connection with a valve of for example a tire in order to guide air from the inflation device through the valve of the tire for inflating the tire.

After the tire valve is fit into the inflation connector, a trigger bar coupled to the inflation connector must be pulled to have the inflation connector securely coupled to the valve of the tire in order to prevent air leaking during the process of inflation.

The conventional arrangement of the pull bar of the inflation connector is operated in such a way that the pull bar must be pulled upward from a horizontal position to a vertical position or pushed downward from the vertical position back to the horizontal position in order to secure or release the valve of the tire. Such an arrangement of pull bar that has to be moved from the horizontal position to the vertical position or from the vertical position to the horizontal position may easily interfere with obstacles (such as wheel rim and spokes coupled to the wheel rim) located around. Even the pull bar is not interfered with by the neighboring obstacles, interference may still occur between the hands of an operator that hold the pull bar and the neighboring obstacles, making it difficult for operation. This imposes a limitation to the space where the operation of inflation is to be made and may easily interrupt the operation of pulling the pull bar, eventually resulting in unsecure coupling between the inflation connector and the tire valve and thus inflation becomes difficult.

SUMMARY OF THE INVENTION

In view of such problems, an object of the present invention is to provide a horizontally-triggerable inflation connector, which is operable through pulling conducted in a horizontal condition so as to alleviate interference with external objects during the process of pulling and thus improving operation smoothness of inflation.

The present invention aims to provide a horizontally-triggerable inflation connector, which comprises a casing, a packing unit, and a pull bar. The packing unit is received in the casing. The pull bar is arranged outside the casing and coupled to the packing unit. The pull bar is horizontally and reciprocally movable between a released position and a secured position. When the pull bar is at the released position, the packing unit is set in a released condition and when the pull bar is at the secured position, the packing unit is set in a compressed condition. Thus, the horizontally-triggerable inflation connector is operable to selectively secure or release an air valve so as to achieve convenience of operation.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
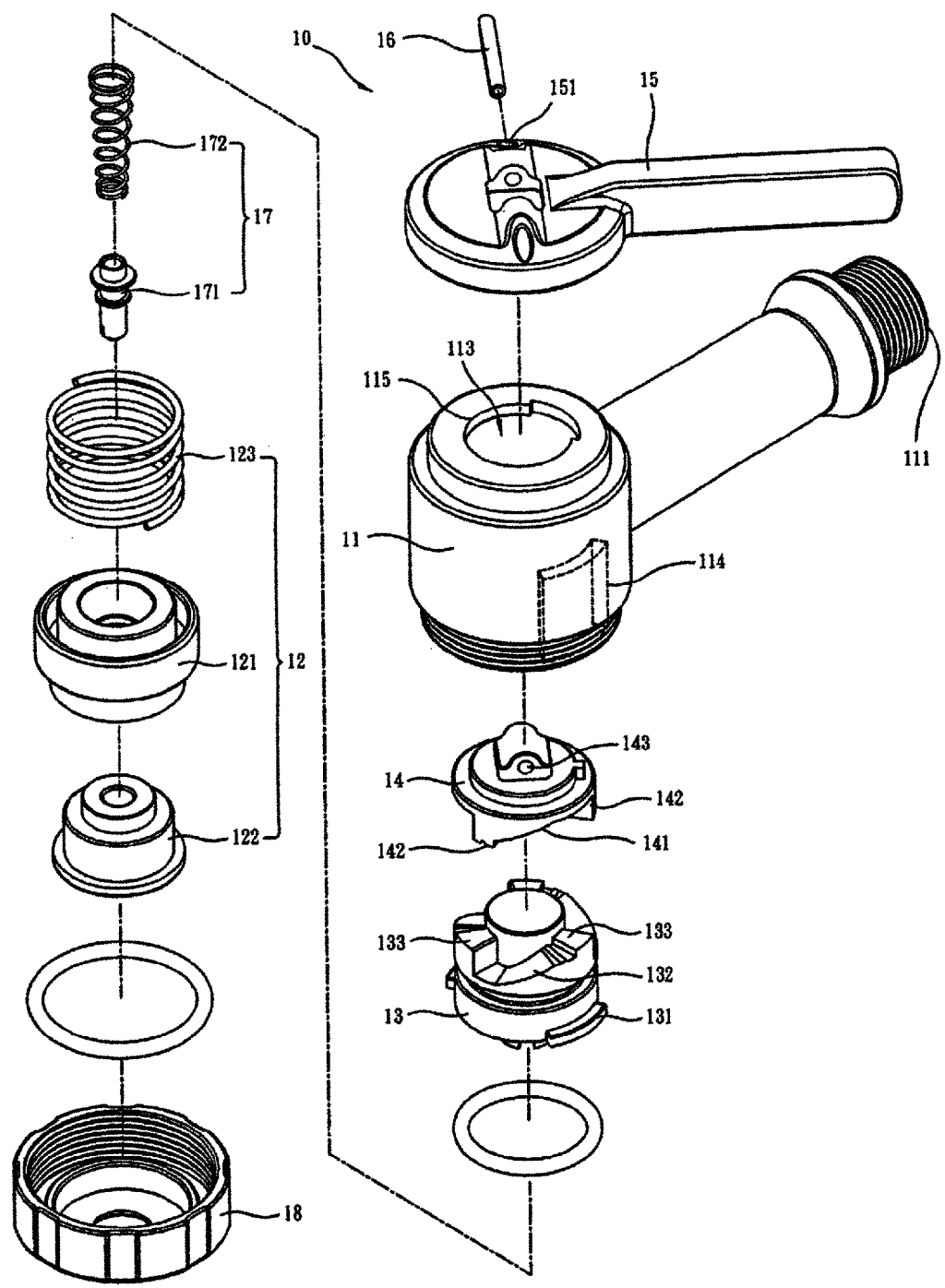
FIG. 1 is an exploded view of a first preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, a horizontally-triggerable inflation connector constructed in accordance with a first preferred embodiment of the present invention, generally designated at 10, is shown, comprising a casing 11, a packing unit 12, a conversion member 13, a driving member 14, a pull bar 15, a pin 16, a nozzle unit 17, and a locking cap 18.

Figure 2:
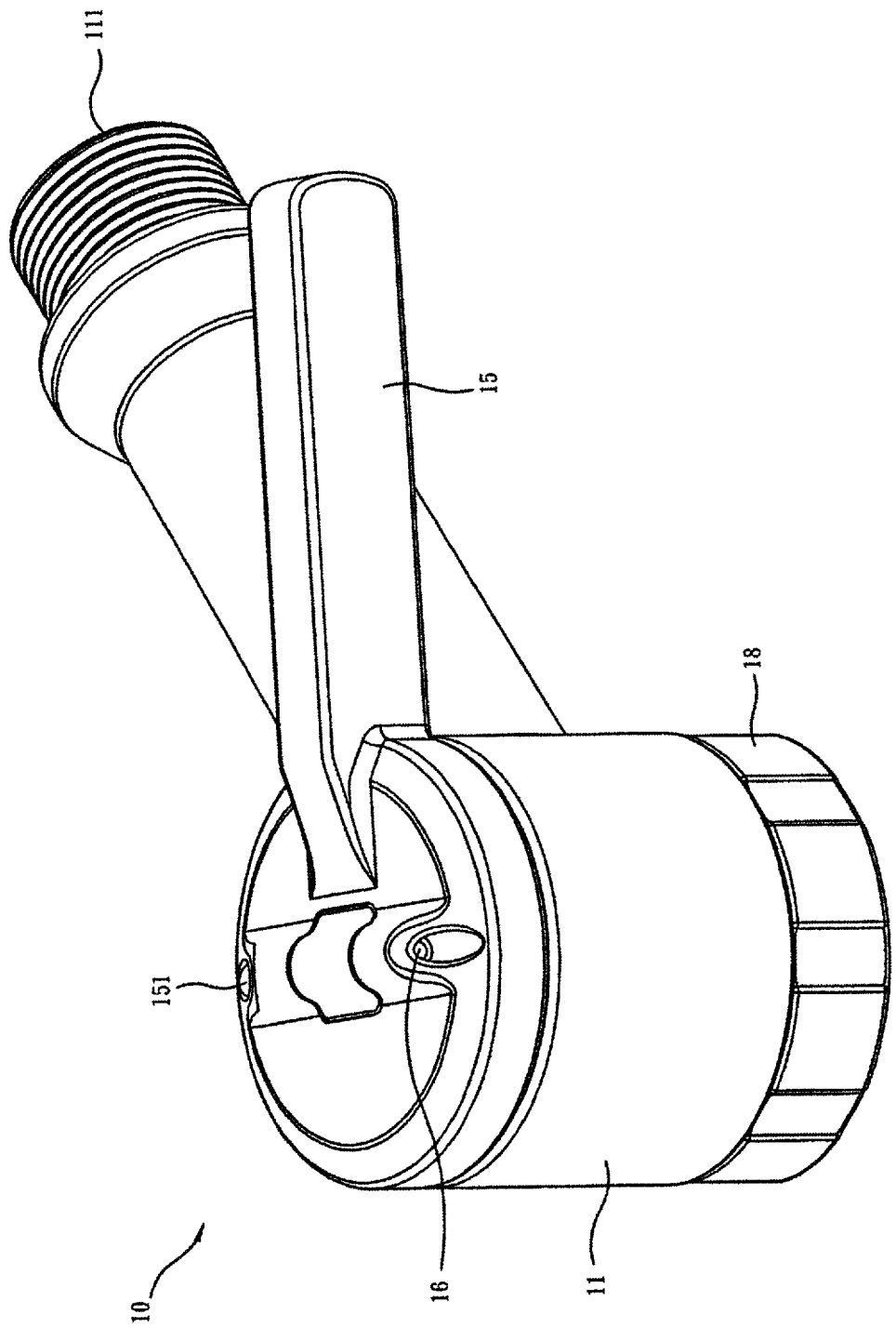
FIG. 2 is a perspective view of the embodiment of FIG. 1 in an assembled form.
Figure 3:
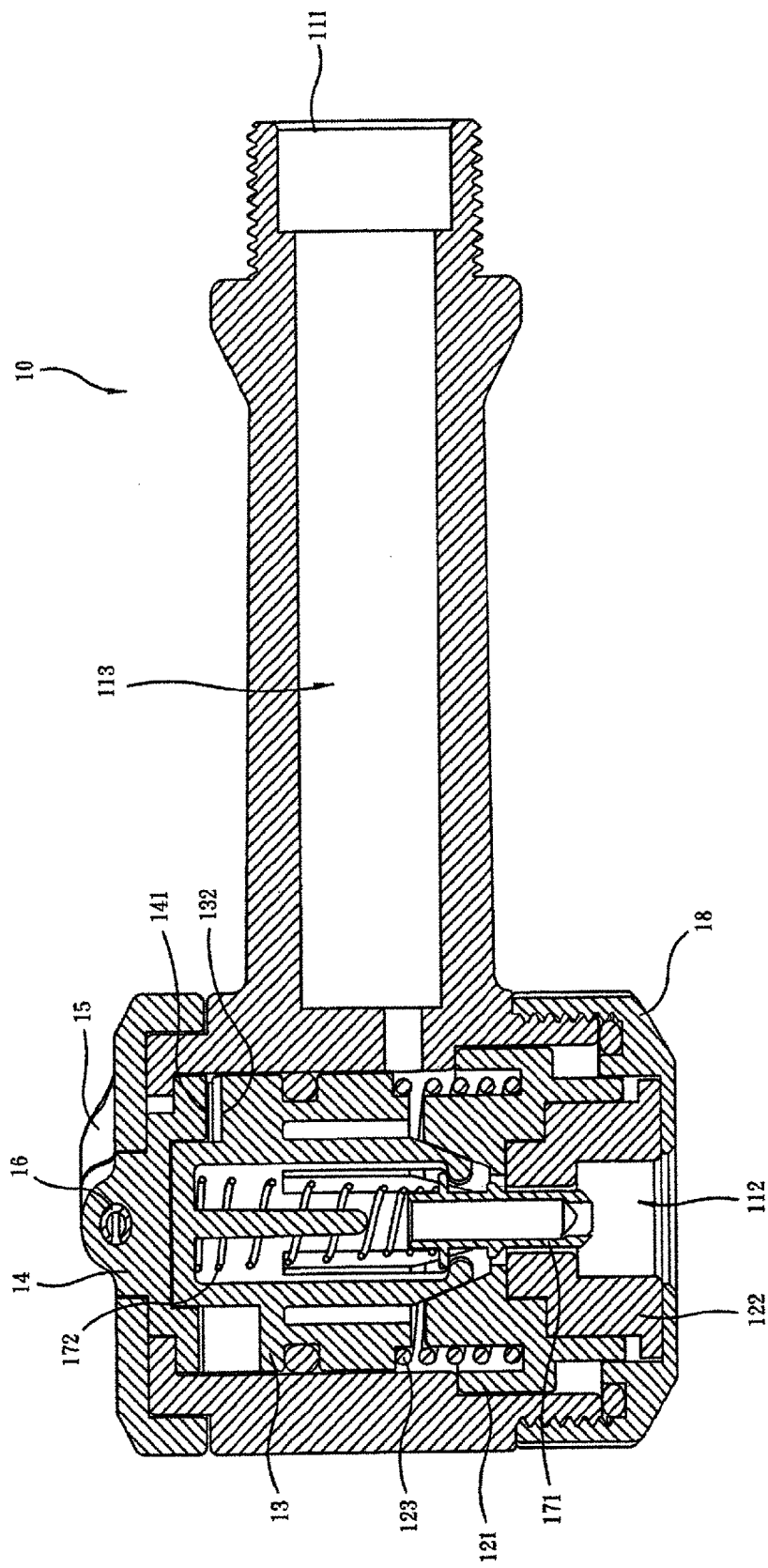
FIG. 3 is a cross-sectional view of the embodiment of FIG. 1 in an assembled form.

Referring to FIGS. 1-3, the casing 11 forms an air supply device connection port 111 in communication with the outside, an inflation connection port 112 n communication with the outside, an inflation channel 113 formed inside the casing 11 and communicating with the air supply device connection port 111 and the inflation connection port 112, and at least one guide channel 114 formed in an inside surface of the casing 11.

Referring to FIGS. 1-3, the packing unit 12 is received in the casing 11 and is switchable, upon being acted upon by an external force, to between a compressed condition and a released condition. The packing unit 12 comprises an action seat 121, a packing ring 122 abutting inside a bottom of the action seat 121, and a spring 123 having an end abutting a top of the action seat 121. The packing ring 122 is made of rubber or a material that is deformable due to be acted upon by an external force and is restorable when the external force is removed.

Referring to FIGS. 1-3, the conversion member 13 is received in the casing 11. The conversion member 13 has an outer circumferential surface from which at least one guide section 131 projects outward. The guide section 131 is received in the guide channel 114 of the casing 11 in such a way that the conversion member 13, when acted upon by an external force, is only reciprocally slidable along the guide channel 114 in an up-down direction. The conversion member 13 has a bottom supported on a top end of the spring 123 of the packing unit 12, whereby when the conversion member 13 is acted upon by an external force and thus makes linear sliding movement, the conversion member 13 applies a force to the packing unit 12 to have the packing ring 122, of the packing unit 12 compressed. The conversion member 13 has a top forming a plurality of first slopes 132 that is arranged circumferentially in an equally-spaced manner. Each of the first slopes 132 has upper and lower ends each of which fauns a first stop 133.

Referring to FIGS. 1-3, the driving member 14 is received in the casing 11. The driving member 14 has a bottom forming a plurality of second slopes 141 that is arranged circumferentially in an equally-spaced manner. Each of the second slopes 141 has upper and lower ends each of which forms a second stop 142. The driving member 14 is arranged in such a way that the second slopes 141 are respectively set in engagement with the first slopes 132 of the conversion member 13, whereby when the driving member 14 is acted upon by an external force to rotate, the second slopes 141 are slidable along the first slopes 132 of the conversion member 13 so as to forcibly cause the conversion member 13 to make liner downward movement.

Referring to FIGS. 1-3, the pull bar 15 is arranged outside the casing 11 and is coupled to the driving member 14. The pull bar 15 is reciprocally rotatable on a horizontal plane between a released position and a secured position when being pulled or pushed in order to drive the driving member 14 to do reciprocal rotation.

Referring to FIGS. 1-3, the pin 16 couples the pull bar 15 and the driving member 14 together. The casing 11 has a top forming an opening 115. The driving member 14 has a top forming a first insertion hole 143 and the first insertion hole 143 is located outside the opening 115 of the casing 11. The pull bar 15 forms a second insertion hole 151 in alignment with the first insertion hole 143 of the driving member 14. The pin 16 is received through the second insertion hole 151 of the pull bar 15 and the first insertion hole 143 of the driving member 14 to operatively couple the pull bar 15 and the driving member 14 together for rotation in unison with each other.

Referring to FIGS. 1-3, the nozzle unit 17 is received in the casing 11 and positioned against the bottom of the conversion member 13 to be movable in unison with the conversion member 13. The nozzle unit 17 comprises a nozzle 171 and a spring 172 arranged between the nozzle 171 and the bottom of the conversion member 13.

Referring to FIGS. 1-3, the locking cap 18 is secured to a circumference of the inflation connection port 112 of the casing 11 to retain the packing unit 12 and the conversion member 13 inside the casing 11 and prevent undesired separation of the packing unit 12 and the conversion member 13 from the casing 11.

The components of the horizontally-triggerable inflation connector 10 according to the first preferred embodiment of the present invention and the assembling thereof have been described above. In the following, operation of the inflation connector will be described.

As shown in FIG. 3, to conduct an inflation operation, the air supply device connection port 111 of the casing 11 is first connected to an air supply device (not shown) and the inflation connection port 112 of the casing 11 receives an air valve 90 (which can be an air valve of a tire or an air valve of any inflatable object) to fit therein to be located inside the packing ring 122 of the packing unit 12.

Figure 4:
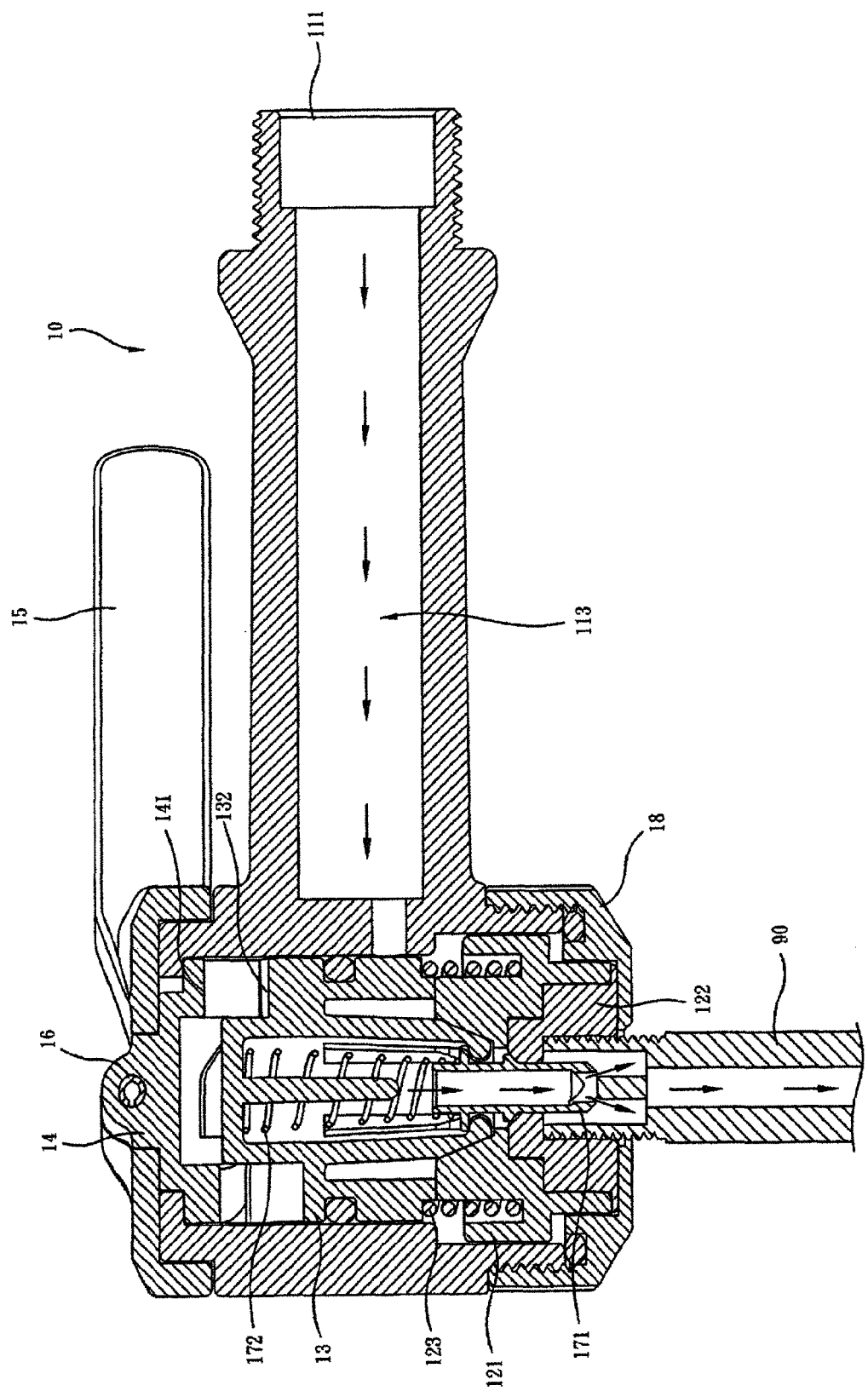
FIG. 4 is a cross-sectional view illustrating operation of the embodiment of FIG. 1.
Figure 5:
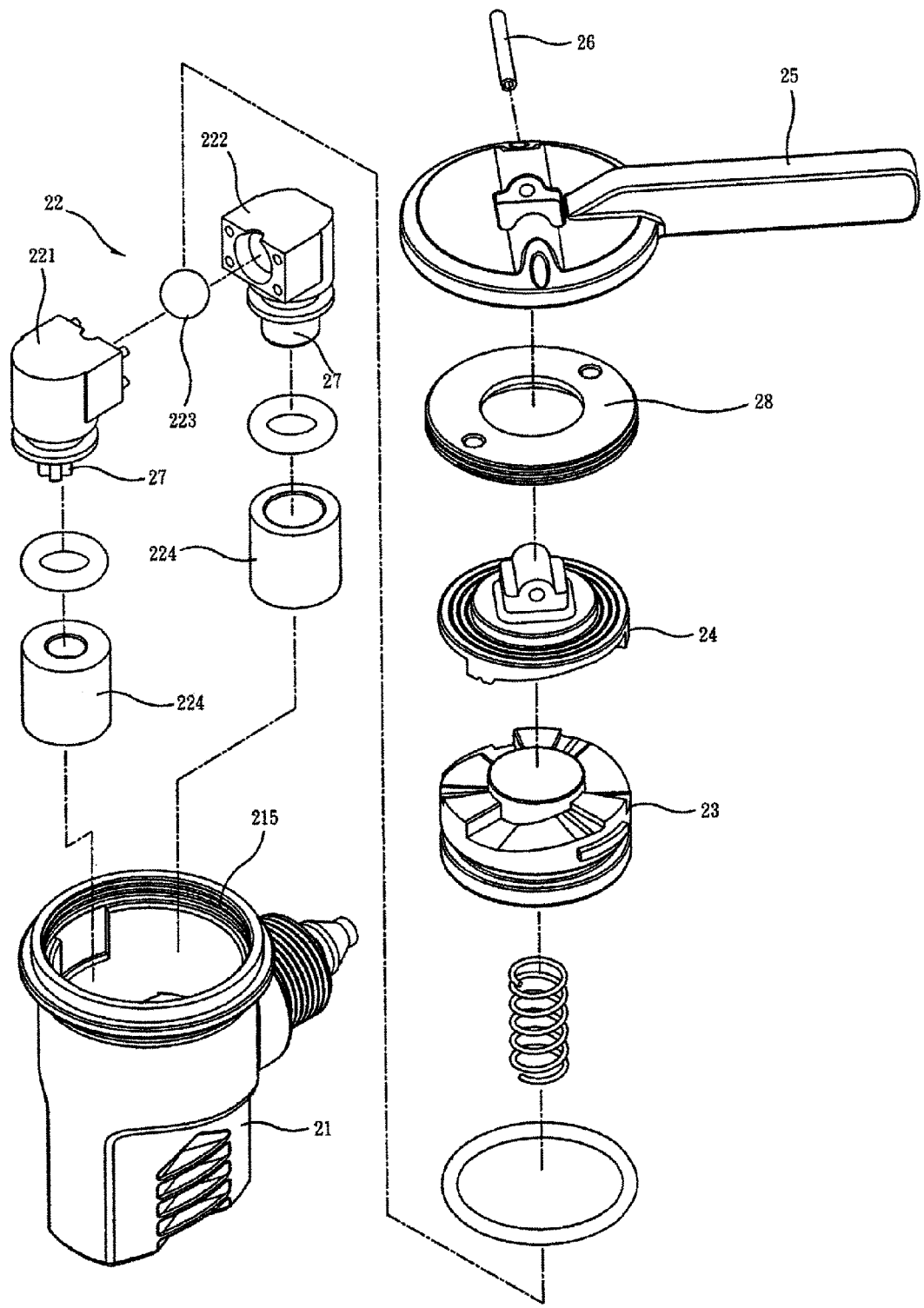
FIG. 5 is an exploded view of a second preferred embodiment of the present invention.
Figure 6:
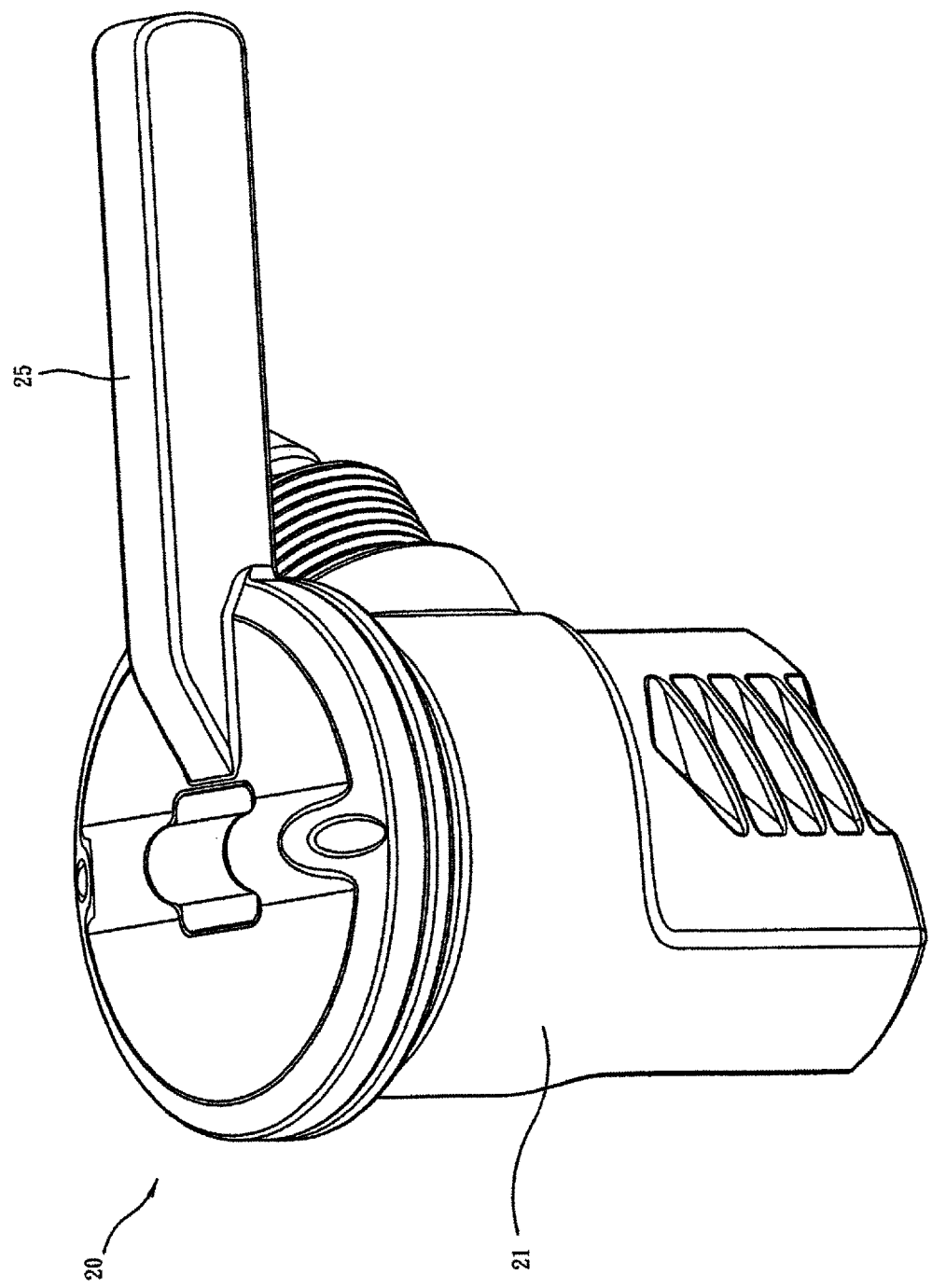
FIG. 6 is a perspective view of the embodiment of FIG. 5 in an assembled form.

Then, as shown in FIG. 4, the pull bar 15 is horizontally pulled from the released position to the secured position, whereby the pull bar 15 drives the driving member 14 to rotate and the second slopes 141 of the driving member 14 are caused to slide along the first slopes 132 of the conversion member 13 to force the conversion member 13 downward along the guide channel 114 and apply a force to the packing unit 12 to compress and deform the packing ring 122 of the packing unit 12 to thereby secure to the air valve 90. Under this condition, the air valve 90 is securely and tightly coupled to the packing unit 12 so that when air that is supplied through the air supply device connection port 111 of the casing 11 is conducted through the inflation channel 113 to fill into the air valve 90, the inflation operation may proceed with an air-tight condition. After the inflation operation, the pull bar 15 is horizontally pulled from the secured position to the released position, allowing the conversion member 13 to slide upward along the guide channel 114 and the packing unit 12 is no longer acted upon by a force, whereby the packing ring 122 releases the air valve 90 to allow the air valve 90 to be detached from the inflation connection port 112 of the casing 11.

As such, the horizontally-triggerable inflation connector 10 provided by the present invention allows the pull bar 15 to horizontally move between the released position and the secured position. This makes the operation smooth and reduces the chance that the pull bar 15 or a hand holding the pull bar 15 interferes with an external object (such as wheel rim and spokes of the rim).

Further, the first stops 133 of the conversion member 13 and the second stops 142 of the driving member 14 provide a function of stopping excessive sliding motion of the first and second slopes 132, 141 to prevent the second slopes 141 from sliding off the first slopes 132.

Figure 7:
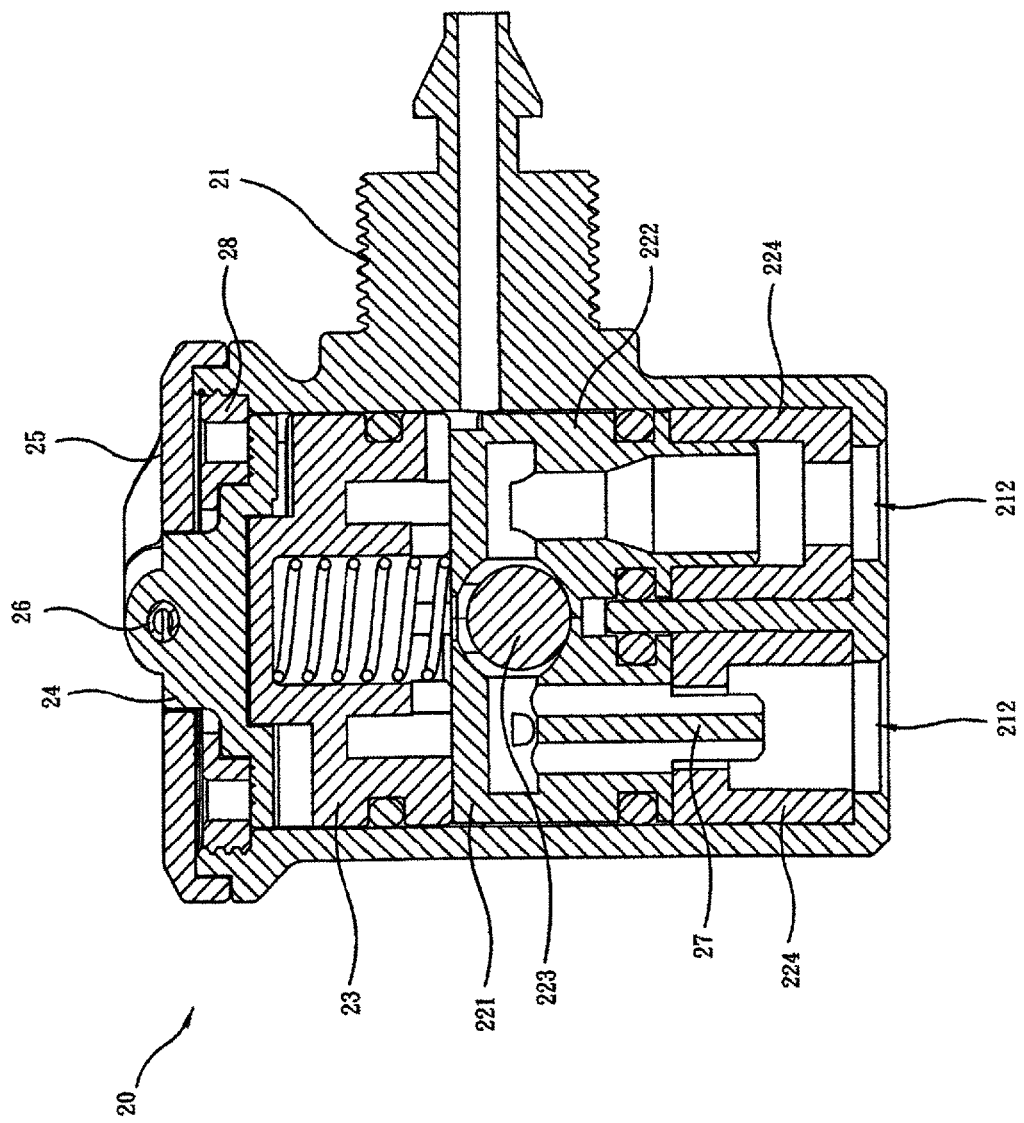
FIG. 7 is a cross-sectional view of the embodiment of FIG. 5 in an assembled form.
Figure 8:
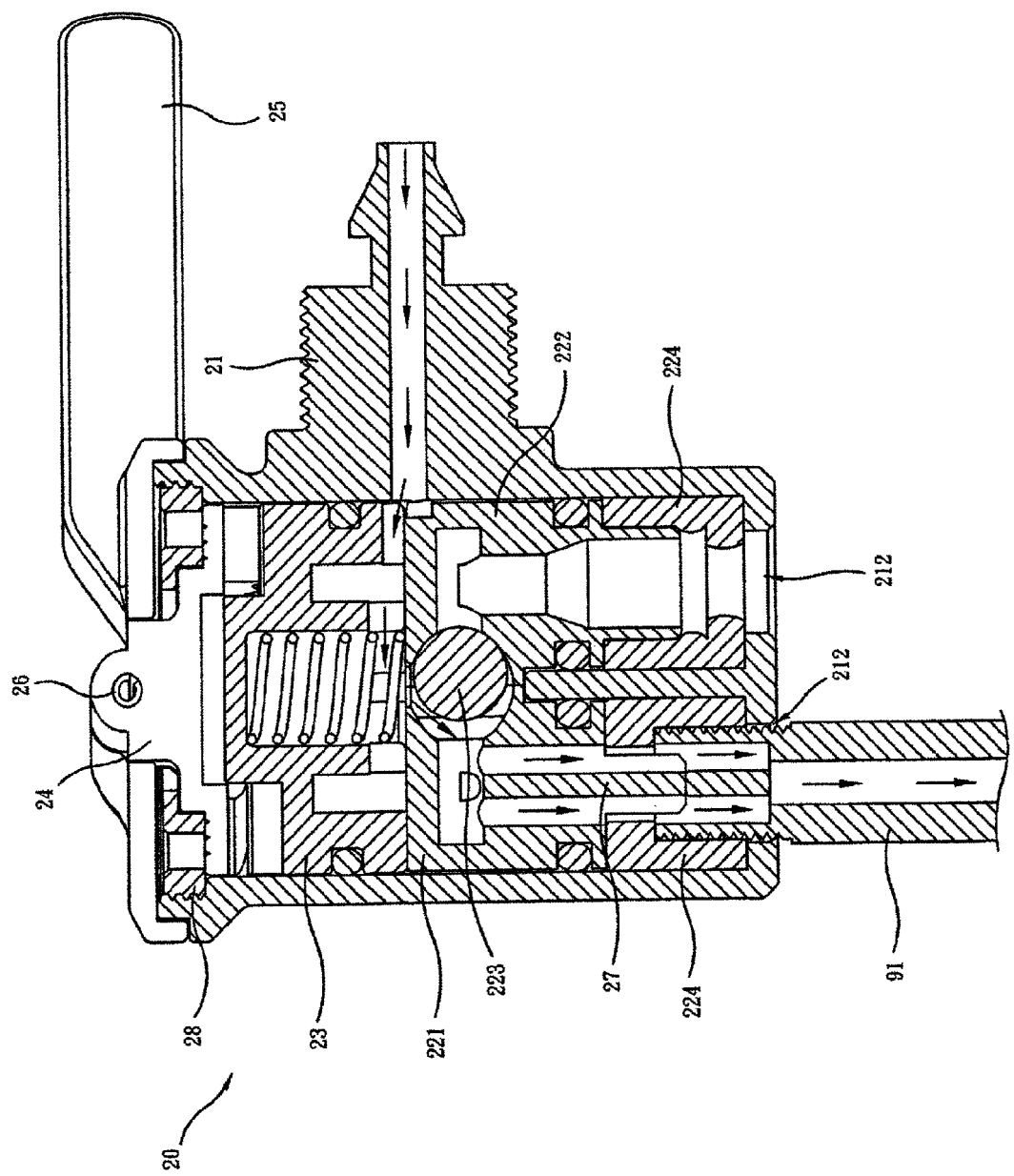
FIG. 8 is a cross-sectional view illustrating operation of the embodiment of FIG. 5.
Figure 9:
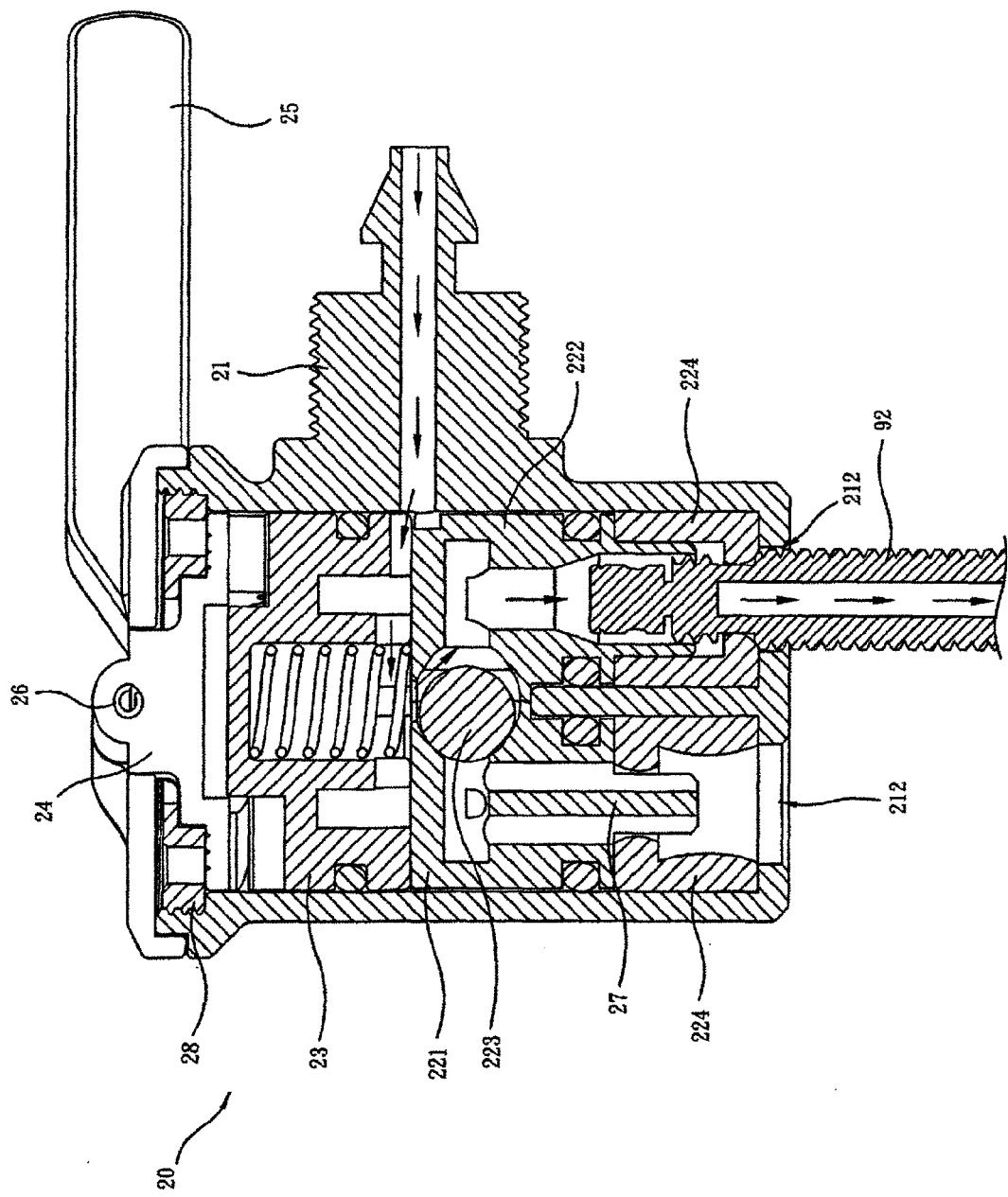
FIG. 9 is a cross-sectional view illustrating operation of the embodiment of FIG. 5.

Referring to FIGS. 5-9, a horizontally-triggerable inflation connector constructed in accordance with a second preferred embodiment of the present invention, generally designated at 20, is shown and comprises, similar to the first preferred embodiment, a casing 21, a packing unit 22, a conversion member 23, a driving member 24, a pull bar 25, a pin 26, and a nozzle unit 27. A primary difference of the instant embodiment from the first preferred embodiment will be described as follows:

In the instant embodiment, the casing 21 forms two inflation connection ports 212 (as shown in FIG. 7), of which one inflation connection port 212 is mateable with a Schrader valve 91 (see FIG. 8), while the other one inflation connection port 212 is mateable with a Presta valve 92 (see FIG. 9), whereby connection can be made between the present invention and either one of the Schrader valve 91 and the Presta valve 92 to carry out inflation operations.

In the instant embodiment, the packing unit 22 comprises a first seat member 221, a second seat member 222 jointed to the first seat member 221, a switching member 223 movably positioned between the first and second seat members 221, 222, and two packing rings 224 respectively connected to bottoms of the first and second seat members 221, 222. When a Schrader valve 91 is fit into one of the inflation connection ports 212 of the casing 21, the switching member 223 is forced by air pressure to move toward the second seat member 222 (see FIG. 8) so that air is only allowed to flow through the first seat member 221 into the Schrader valve 91 and air leaking can be prevented. When a Presta valve 92 is fit into another one of the inflation connection ports 212 of the casing 21, the switching member 223 is forced by air pressure to move toward the first seat member 221 (see FIG. 9) so that air is only allowed to flow through the second seat member 222 into the Presta valve 92 and similarly air leaking can be prevented.

In the instant embodiment, the locking cap 28 is secured to a circumference of the opening 215 of the casing 21 for similarly retaining and preventing the packing unit 22 and the conversion member 23 from separating from the casing 21.

In the instant embodiment, the nozzle units 27 are mounted to bottoms of the first seat member 221 and the second seat member 222 of the packing unit 12 to mate the Schrader valve 91 and the Presta valve 92.

As such, the instant embodiment is similarly operable for horizontally pulling to secure or release an air valve and is also operable for connection with two different types of air valves, such as a Schrader valve and a Presta valve so as to further improve the utilization of the present invention.

It is apparent that although in the above embodiments, the casing is provided with one or two the inflation connection ports, yet the present invention may also be structurally available for three inflation connection ports to respectively connect a Schrader valve, a Presta valve, and a Woods valve. It is also apparent that with only two inflation connection ports being provided, the inflation connection ports can be arranged to connect a Presta valve and a Woods valve.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A horizontally-triggerable inflation connector, comprising:

a casing;

a packing unit, which is received in the casing;

a pull bar, which is arranged outside the casing and coupled to the packing unit, the pull bar being horizontally and reciprocally movable between a released position and a secured position, whereby when the pull bar is at the released position, the packing unit is set in a released condition and when the pull bar is at the secured position, the packing unit is set in a compressed condition;

conversion member which is received in the casing, the conversion member being positioned against the packing unit, whereby when the conversion member is caused by the pull bar to take a linear movement and selectively apply a force to the packing unit, the packing unit is selectively compressed or released; and a driving member which is received in the casing and coupled to the pull bar, the driving member having a bottom forming a plurality of second slopes that is arranged circumferentially in an equally-spaced manner, the conversion member having a top forming a plurality of first slopes that is arranged circumferentially in an equally-spaced manner, the driving member being arranged in such a way that the second slopes are respectively set in engagement with the first slopes of the conversion member, whereby when the driving member is driven by the pull bar to rotate, the second slopes are slidable along the first slopes of the conversion member so as to cause the conversion member to make liner movement;

wherein each of the second slopes of the driving member has upper and lower ends each of which forms a second stop and each of the first slopes of the conversion member has upper and lower ends each of which forms a first stop.

2. The horizontally-triggerable inflation connector according to claim 1, wherein the casing forms an air supply device connection port in communication with the outside, at least one inflation connection port in communication with the outside, an inflation channel formed inside the casing and communicating with the air supply device connection port and the inflation connection port, the air supply device connection port being adapted to connect an air supply device, the inflation connection port being adapted to receive an air valve to fit therein.

3. The horizontally-triggerable inflation connector according to claim 1, wherein the packing unit comprises an action seat, a packing ring abutting inside a bottom of the action seat, and a spring having an end abutting a top of the action seat, whereby when the pull bar is at the released position, the packing ring of the packing unit is set in the released condition and when the pull bar is at the secured position, the packing ring of the packing unit is in a compressed condition.

4. The horizontally-triggerable inflation connector according to claim 1, wherein the casing has an inside surface forming at least one guide channel, the conversion member having an outer circumferential surface from which at least one guide section projects outward, the guide section being received in the guide channel of the casing in such a way that the conversion member is only reciprocally and linearly slidable along the guide channel.

5. The horizontally-triggerable inflation connector according to claim 1 further comprising a nozzle unit, which is received in the casing, the nozzle unit comprising a nozzle and a spring arranged between the nozzle and the conversion member.

6. The horizontally-triggerable inflation connector according to claim 1 further comprising a locking cap, which is secured to the casing to retain the packing unit and the conversion member inside the casing.

7. The horizontally-triggerable inflation connector according to claim 1 further comprising a pin, the casing forming an opening, the driving member having a top forming a first insertion hole, the first insertion hole being located outside the opening of the casing, the pull bar forming a second insertion hole in alignment with the first insertion hole of the driving member, the pin being received through the second insertion hole of the pull bar and the first insertion hole of the driving member to operatively couple the pull bar and the driving member together for movement in unison with each other.

8. The horizontally-triggerable inflation connector according to claim 1, wherein the casing forms an air supply device connection port in communication with the outside, two inflation connection ports in communication with the outside, an inflation channel formed inside the casing and communicating with the air supply device connection port and the inflation connection ports, the air supply device connection port being adapted to connect an air supply device, one of the inflation connection ports being adapted to receive a Schrader valve to fit therein, the other one of the inflation connection ports being adapted to receive a Presta valve to fit therein.

9. The horizontally-triggerable inflation connector according to claim 8, wherein the packing unit comprises a first seat member, a second seat member jointed to the first seat member, a switching member movably positioned between the first and second seat members, and two packing rings respectively connected to bottoms of the first and second seat members, whereby when the pull bar is at the released position, the packing rings of the packing unit are in a released condition and when the pull bar is at the secured position, the packing rings of the packing unit are in a compressed condition.

10. The horizontally-triggerable inflation connector according to claim 9, wherein when a Schrader valve is fit into one of the inflation connection ports of the casing, the switching member is forced by air pressure to move toward the second seat member so that air is only allowed to flow through the first seat member into the Schrader valve and when a Presta valve is fit into another one of the inflation connection ports of the casing, the switching member is forced by air pressure to move toward the first seat member so that air is only allowed to flow through the second seat member into the Presta valve.

11. The horizontally-triggerable inflation connector according to claim 9 further comprising two nozzle units that are respectively mounted to bottoms of the first seat member and the second seat member of the packing unit.

* * * * *